United States Patent
Pretzlaff et al.

(10) Patent No.: US 7,636,035 B2
(45) Date of Patent: Dec. 22, 2009

(54) TIRE PRESSURE CONTROL SYSTEM FOR A MOTOR VEHICLE

(75) Inventors: Volker Pretzlaff, Hagen (DE); Andreas Tombült, Dortmund (DE); Rainer Vens, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 476 days.

(21) Appl. No.: 11/787,786

(22) Filed: Apr. 18, 2007

(65) Prior Publication Data

US 2007/0198228 A1    Aug. 23, 2007

Related U.S. Application Data

(63) Continuation of application No. PCT/EP2005/011746, filed on Nov. 3, 2005.

(30) Foreign Application Priority Data

Nov. 6, 2004    (DE) ........................ 10 2004 053 696

(51) Int. Cl.
    *B60C 23/00*    (2006.01)
(52) U.S. Cl. .............. 340/442; 340/539.1; 340/425.5; 340/426.24; 340/426.33; 340/444; 340/447
(58) Field of Classification Search ............. 340/539.1, 340/442, 425.5, 426.24, 426.33, 444, 447; 370/10.1
    See application file for complete search history.

(56) References Cited

U.S. PATENT DOCUMENTS 5,280,432 A * 1/1994 Kuwana et al. ............... 701/79

| | | | |
|---|---|---|---|
| 6,435,020 B1 | 8/2002 | Oldenettel et al. | |
| 6,888,446 B2 | 5/2005 | Nantz et al. | |
| 2003/0090372 A1 | 5/2003 | Bergerhoff et al. | |
| 2004/0066290 A1 | 4/2004 | Hernando et al. | |
| 2004/0164854 A1 | 8/2004 | Nantz et al. | |
| 2008/0257470 A1 * | 10/2008 | Biesse ........................ 152/519 | |

FOREIGN PATENT DOCUMENTS

DE    103 24 083 A1    9/2004
EP    1 052 199 A1    11/2000

* cited by examiner

*Primary Examiner*—Daryl Pope
(74) *Attorney, Agent, or Firm*—Brooks Kushman P.C.

(57) ABSTRACT

A tire pressure control system for a vehicle having wheels with tires includes a controller and tire pressure sensors each having a transceiver. The sensors are within respective tires. Each sensor transmits information regarding the pressure of its tire to the controller. The controller transmits to the sensors a signal having markings based on rotation of a selected wheel. The signal as received by each sensor includes variations resulting from rotation of its associated wheel. The variations of the signal as received by the sensor corresponding to the selected wheel agree with the markings and the variations of the signal as received by each of the remaining sensors vary with the markings. Each sensor correlates the variations of the signal as received by the sensor with the markings. The sensor in which the variations of the signal agree with the markings transmits a confirmation regarding same to the controller.

20 Claims, 4 Drawing Sheets

TIRE PRESSURE CONTROL SYSTEM FOR A MOTOR VEHICLE

CROSS-REFERENCE TO RELATED APPLICATIONS

This is a continuation of International Application PCT/EP2005/011746, published in German, with an international filing date of Nov. 3, 2005, which claims priority to DE 10 2004 053 696.1, filed Nov. 6, 2004, the disclosures of which are both hereby incorporated by reference.

BACKGROUND OF THE INVENTION

1. Field of the Invention

The present invention relates to a tire pressure control system for a motor vehicle.

2. Background Art

A tire pressure control system monitors the pressure of the tires installed on the wheels of a vehicle. The tire pressure control system includes tire pressure sensors and a controller located in the vehicle. Each tire pressure sensor is respectively installed within one of the tires. As such, each tire pressure sensor is associated with a wheel (i.e., a wheel position). Each tire pressure sensor generates a tire pressure signal indicative of the pressure of the tire in which the tire pressure sensor is installed. The tire pressure sensors wirelessly transmit the tire pressure signals to the controller. The controller has to know which tire pressure signals correspond to which wheels. That is, the controller has to know which tire pressure sensors correspond to which wheel positions. This requirement is a problem as the tires may be rotated at any time such that the tires are installed on different ones of the wheels.

EP 1 052 119 A1 (corresponds to U.S. Pat. No. 6,435,020) describes a tire pressure control system operable for determining the association between the tire pressure sensors and the wheel positions. Each tire pressure sensor transmits, at certain time intervals, an individual identifier and a high-frequency ("HF") signal to the controller. The HF signals have an individual trace which is dependent upon the rotational angle of the wheel and on the time because of the geometry of the wheel box and as a consequence of the wheel rotation. In the controller, a time point is fixed from two sequential HF signals at which the wheel assumes the same angular position in each case with this wheel being the wheel position from which the HF signals were transmitted. The corresponding wheel has made an integer number of revolutions between the two time points. In the controller, with the aid of rotational speed sensor signals indicative of the rotational speed of the wheels, the wheel position is determined in which the wheel has made an integer number of revolutions between the two time points. The corresponding wheel position is associated to the individual identifier transmitted from the tire pressure sensor.

A disadvantage of this tire pressure control system is that the tire pressure sensors transmit the HF signals to the controller thereby subjecting their internal power supplies to relatively heavy stress. Furthermore, this initialization process is regularly repeated such as each time the vehicle is started. A problem is that the internal power supplies are usually intended to only last for the typical service life of a tire.

SUMMARY OF THE INVENTION

An object of the present invention is a tire pressure control system in which the association between tire pressure sensors and wheel positions takes place with relatively low energy consumption.

In carrying out the above object and other objects, the present invention provides a tire pressure control system for a vehicle having wheels with each wheel having a tire thereon. The system includes a controller and a plurality of tire pressure sensors each having a transceiver. The controller is operable for receiving information indicative of the rotational speed of each wheel. The sensors are respectively within the tires such that the sensors are respectively associated with the wheels. Each sensor generates tire pressure information indicative of the pressure of the tire in which the sensor is within. The sensors transmit the tire pressure information to the controller for the controller to determine the tire pressure of the tires. The controller transmits to the sensors a signal modulated with signal markings based on the rotational speed of a selected wheel. The signal as received by each sensor includes variations resulting from the rotation of the wheel associated with the sensor. The variations of the signal as received by the sensor corresponding to the selected wheel remain constant over time with respect to the signal markings and the variations of the signal as received by each of the remaining sensors varies over time with respect to the signal markings. Each sensor correlates the variations of the signal as received by the sensor with the signal markings. The sensor in which the variations of the signal as received by the sensor remain constant over time with respect to the signal markings transmits confirmation to the controller. The controller determines this sensor as corresponding to the selected wheel based on the confirmation.

Further, in carrying out the above object and other objects, the present invention provides a tire pressure control system for a vehicle having wheels with each wheel having a tire thereon. The system includes a controller and a plurality of tire pressure sensors each having a transceiver. The controller is operable for receiving information indicative of the rotational speed of each wheel. The sensors are respectively within the tires such that the sensors are respectively associated with the wheels. Each sensor transmits tire pressure information indicative of the pressure of the tire in which the sensor is within to the controller. The controller transmits to the sensors a signal periodically marked with a signal marking upon each revolution of a selected wheel. The signal as received by each sensor includes variations resulting from the rotation of the wheel associated with the sensor. The variations of the signal as received by the sensor corresponding to the selected wheel agree over time with the signal markings and the variations of the signal as received by each of the remaining sensors vary over time with the signal markings. Each sensor correlates the variations of the signal as received by the sensor with the signal markings. The sensor in which the variations of the signal as received by the sensor agree over time with the signal markings transmits confirmation to the controller. The controller determines this sensor as corresponding to the selected wheel based on the confirmation.

Also, in carrying out the above object and other objects, the present invention provides a tire pressure control system for a vehicle having wheels with each wheel having a tire thereon. The system includes a controller and a plurality of tire pressure sensors each having a transceiver. The controller is operable for receiving information indicative of rotation of each wheel. The sensors are respectively within the tires such that the sensors are respectively associated with the wheels. Each sensor transmits tire pressure information indicative of the pressure of the tire in which the sensor is within to the controller. The controller transmits to the sensors a signal having markings containing periodicity corresponding to the time for a selected wheel to make a revolution. The signal as received by each sensor includes a periodic portion resulting from rotation of the wheel associated with the sensor relative to the controller. The periodic portion of the signal as received by the sensor corresponding to the selected wheel agrees with the markings and the periodic portion of the signal as received by each of the remaining sensors varies relative to the markings. Each sensor correlates the periodic portion of the signal as received by the sensor with the markings. The sensor in which the periodic portion of the signal as received by the sensor agrees with the markings transmits confirmation to the controller. The controller determines this sensor as corresponding to the selected wheel based on the confirmation.

In a tire pressure control system in accordance with an embodiment of the present invention, the controller and each wheel sensor module (i.e., each tire pressure sensor) include a high-frequency ("HF") transceiver. That is, the controller and each wheel sensor module include a transmitter and a receiver by which bidirectional signals may be communicated between the controller and each wheel sensor module.

An energy-conserving association of the tire pressure sensors with the individual wheel positions is achieved as the controller transmits a HF signal to the wheel sensor modules as opposed to the wheel sensor modules transmitting HF signals to the controller.

The HF signal transmitted from the controller to the wheel sensor modules includes markings containing the periodicity corresponding to the time for one of the wheels to make a revolution. The HF signal is received by all of the wheel sensor modules. Because the receivers of the wheel sensor modules rotate relative to the antenna of the controller, which is stationarily mounted in the vehicle, the field strength trace of the received HF signal in each case has an additional periodic portion which results from the rotation of the particular wheel. Through a comparison of this periodic portion to the markings contained in the HF signal, each wheel sensor module is able to recognize whether the periodicity of the received markings corresponds to its own speed of revolution. If this is the case for a particular wheel sensor module, then this wheel sensor module sends a brief confirmation signal to the controller thereby establishing the position of this wheel sensor module.

Embodiments of the present invention are explained in the Detailed Description section with reference to the drawings, in which a tire pressure control system in accordance with an embodiment of the present invention and possible sequences for assigning wheel positions in accordance with embodiments of the present invention are described.

DETAILED DESCRIPTION OF THE PREFERRED EMBODIMENT(S)

Figure 1:
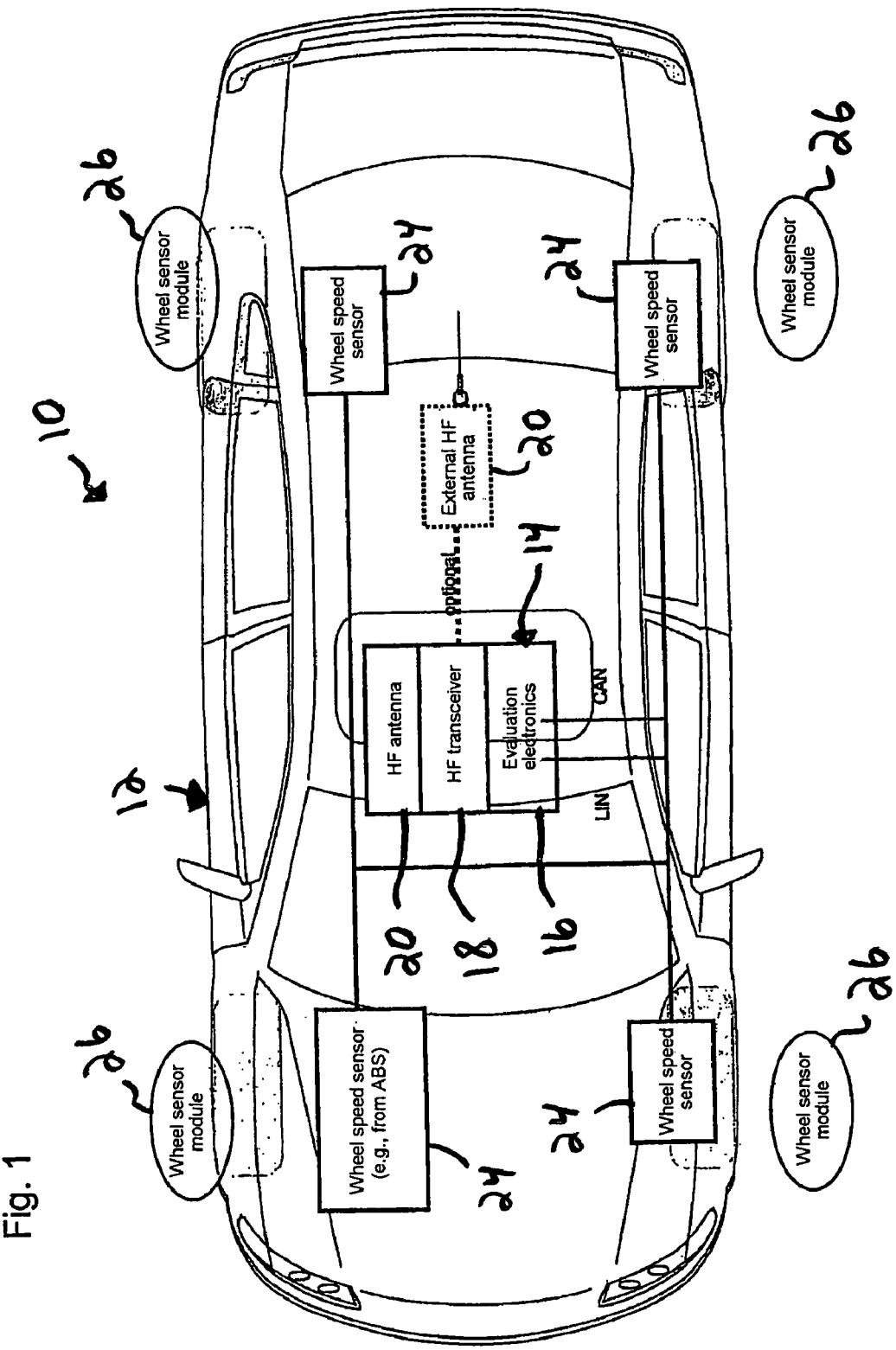
FIG. 1 illustrates a tire pressure control system for a vehicle in accordance with an embodiment of the present invention.

Referring now to FIG. 1, a tire pressure control system 10 for a vehicle 12 in accordance with an embodiment of the present invention is shown. Vehicle 12 includes four wheels. Each wheel is located at a unique wheel position relative to the body of vehicle 12. A tire is installed on each wheel. As such, each tire is located at one of the wheel positions.

Tire pressure control system 10 includes a controller 14. Controller 14 is located in vehicle 12. Controller 14 includes evaluation electronics (i.e., an evaluation processor) 16 and a high-frequency ("HF") transceiver 18. Evaluation processor 16 is connected to a data bus system (e.g., LIN, CAN) of vehicle 12. HF transceiver 18 includes at least one HF antenna 20 in order to transmit and receive HF signals. The at least one HF antenna 20 may include internal and/or external HF antennas.

Wheel speed sensors (i.e., rpm sensors) 24 are respectively associated with the wheels. Wheel speed sensors 24 are typically present in vehicle 12 for other vehicle applications such as anti-lock braking. Each wheel speed sensor 24 generates a rotational speed signal indicative of the rotational speed of the associated wheel. Wheel speed sensors 24 provide the rotational speed signals to the data bus system. Evaluation processor 16 of controller 14 receives the rotational speed signals of wheel speed sensors 24 via the data bus system for use by tire pressure control system 10.

Tire pressure control system 10 further includes four wheel sensor modules 26. Each wheel sensor modules 26 is respectively installed in one of the tires. As such, each wheel sensor module 26 is located at one of the wheel positions. Each wheel sensor module 26 generates a tire signal indicative of conditions of its associated tire. In contrast to wheel speed sensors 24 whose rotational speed signals may be associated with fixed sensor mounting sites in vehicle 12, associating the tire signals from wheel sensor modules 26 at specific wheel positions is difficult as the association may change at any time as a result of the tires being rotated. Thus, the association between wheel sensor modules 26 and their mounting sites (i.e., their wheel positions) must be routinely checked (such as with every vehicle startup) or carried out anew on demand by the push of a button via an onboard computer or the like.

Figure 2:
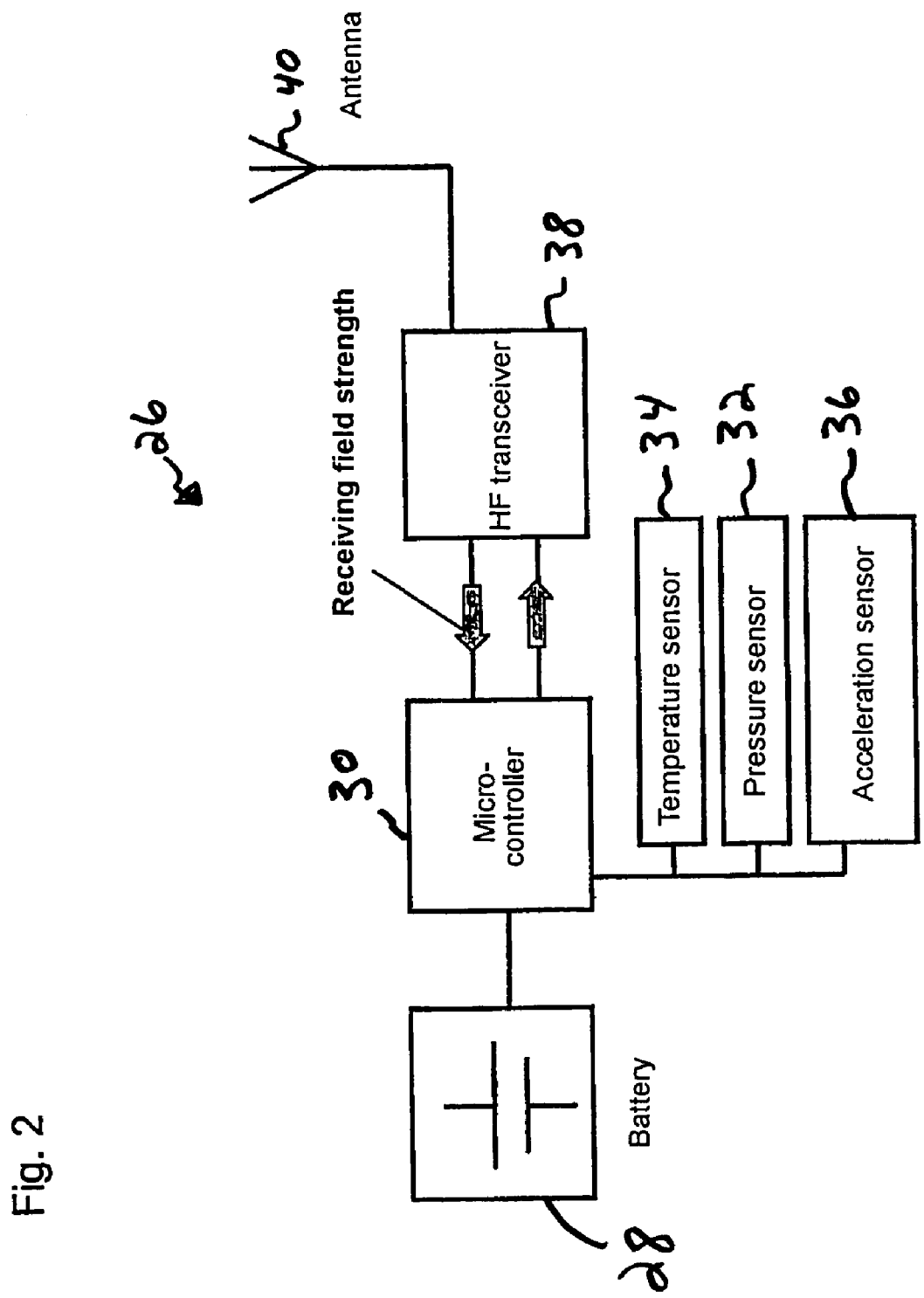
FIG. 2 illustrates a block diagram of a wheel sensor module in accordance with an embodiment of the present invention.

Referring now to FIG. 2, a block diagram of a wheel sensor module 26 in accordance with an embodiment of the present invention is shown. Wheel sensor module 26 includes a battery 28. Battery 28 may be a compact round cell, for example. Battery 28 supplies the other components of wheel sensor module 26 with electrical power. The power consumption of these components should be as low as possible as it is not practical to replace battery 28 during the overall service life of the tire.

Wheel sensor module 26 further includes a micro-controller 30 and a tire pressure sensor 32. Tire pressure sensor 32 is operable for monitoring the pressure of the tire associated with wheel sensor module 26. Tire pressure sensor 32 generates a tire pressure signal indicative of the tire pressure of the tire. Micro-controller 30 evaluates the tire pressure signal to determine the tire pressure of the tire of the tire. Wheel sensor module 26 may further include additional tire sensors such as a temperature sensor 34 for monitoring the temperature of the tire and an acceleration sensor 36 for monitoring the acceleration of the wheel on which the tire is installed.

Wheel sensor module 26 further includes an HF transceiver 38. HF transceiver 38 includes an HF antenna 40. HF transceiver 38 of wheel sensor module 26 and HF transceiver 18 of controller 14 are able to bi-directionally communicate with one another via antennas 20, 40. For this purpose, HF antenna 40 is used both as a transmitting and a receiving antenna. Micro-controller 30 is in communication with HF transceiver 38 to communicate with controller 14. Micro-controller 30 provides the sensor signals from sensors 32, 34, 36 to controller 14 for receipt by evaluation processor 16 of controller 14. As explained in further detail below, micro-controller 30 receives HF signals transmitted from controller 14 as part of the process carried out by tire pressure control system 10 to determine the association between wheel sensor modules 26 and the wheel positions.

The transmission/reception conditions of antenna 40 of wheel sensor module 26 vary with the wheel rotation of the tire in which wheel sensor module 26 is installed as wheel sensor module 26 takes part in the rotational motion of the tire relative to the body of vehicle 12. Thus, an HF signal transmitted with a constant transmitting field strength from controller 14 does not result in a constant receiving field strength at the wheel sensor module 26 on account of the variable distance between antennas 20, 40, changing polarization direction of HF signals relative to the position of antenna 40, and variable shadowing by other vehicle components due to antenna 40 rotating together with the wheel. Instead, an HF signal transmitted with a constant transmitting field strength from controller 14 results in a field strength signal, periodic with the wheel rotation, having a variable trace over the duration of the period (for instance, see FIGS. 3A and 4A).

Figure 3:
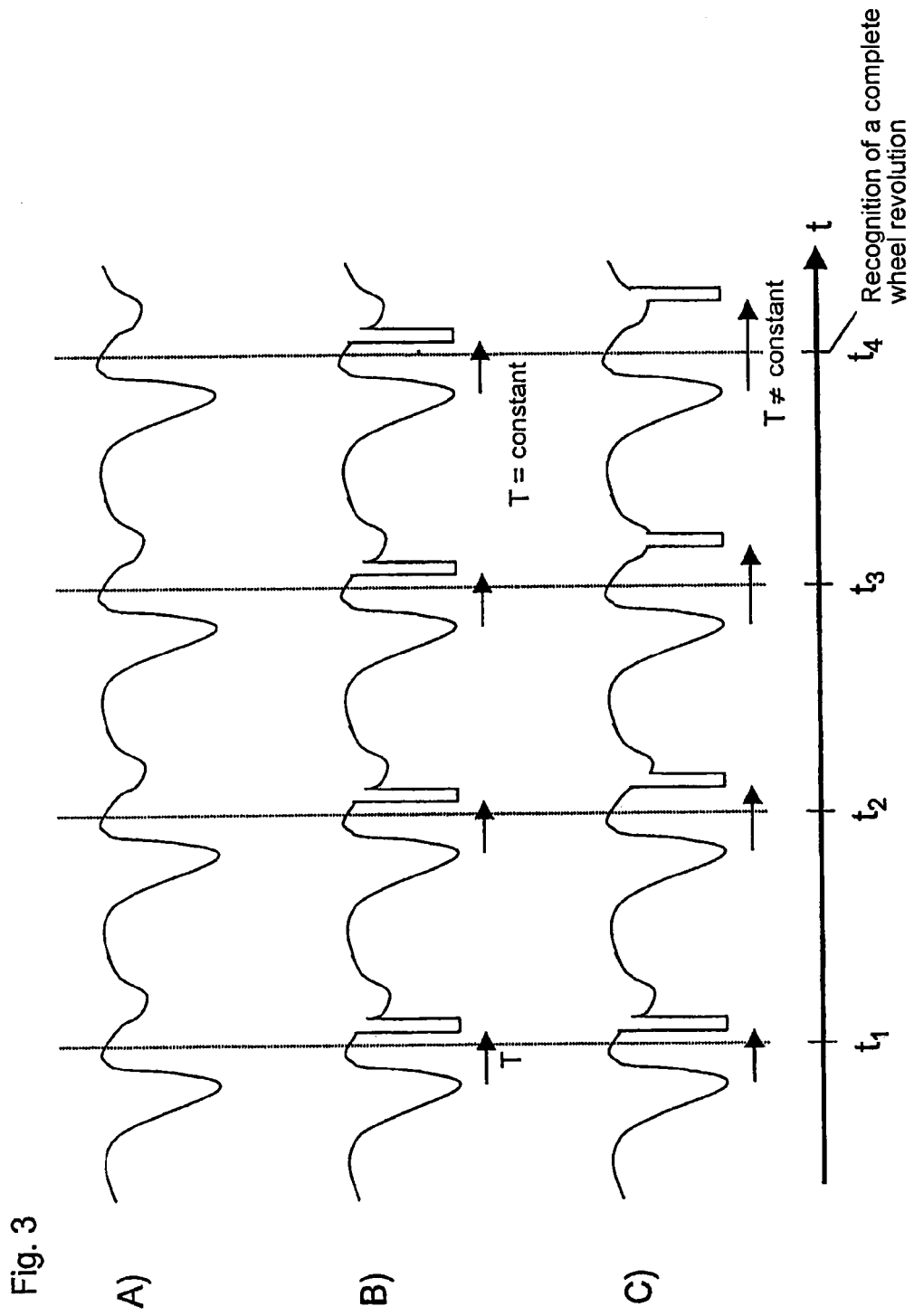
FIG. 3A illustrates a trace of a constant strength high-frequency signal as received from the controller by a wheel sensor module in accordance with an embodiment of the present invention.
FIG. 3B illustrates a trace of a high-frequency signal, modulated as a function of the rotation of the wheel at a selected wheel position, as received from the controller by the wheel sensor module corresponding to the selected wheel position in accordance with an embodiment of the present invention.
FIG. 3C illustrates a trace of the modulated high-frequency signal as received from the controller by the other wheel sensor modules which do not correspond to the selected wheel position in accordance with an embodiment of the present invention.

Referring now to FIG. 3, field strength traces of HF signals as received by wheel sensor modules 26 in accordance with an embodiment of the present invention are shown. FIG. 3A illustrates the trace of a constant strength HF signal received by a wheel sensor module 26 from controller 14. FIG. 3B illustrates the trace of an HF signal, modulated as a function of the rotation of the wheel at a selected wheel position, as received by the wheel sensor module 26 corresponding to the selected wheel position from controller 14. FIG. 3C illustrates the trace of the modulated HF signal as received by the other wheel sensor modules 26 which do not correspond to the selected wheel position from controller 14.

The operation carried out by tire pressure control system 10 to associate wheel sensor modules 26 with wheel positions in accordance with an embodiment of the present invention may be more fully explained with reference to FIG. 3. To this end, tire pressure control system 10 makes use of the knowledge that the number of wheel revolutions at the individual wheel positions over an interval of time differs depending on various parameters such as tire circumference, tire pressure, cornering, and the like. That is, tire pressure control system 10 makes use of the knowledge that the rotational speeds of the wheels differs from one another depending on the various parameters.

Tire pressure control system 10 generally includes the following operations in order to associate wheel sensor modules 26 with the wheel positions. Controller 14 generates a constant strength HF signal for transmission to wheel sensor modules 26. Wheel sensor modules 26 receive the same HF signal from controller 14. This is in contrast to the background art in which wheel sensor modules transmit HF signals to a controller.

FIG. 3A illustrates the trace of a constant strength HF signal received from controller 14 by a wheel sensor module 26. The amplitude (i.e., field strength) of the trace varies over time (i.e., is not constant) on account of the variable distance between wheel sensor module 26 and controller 14, the changing polarization direction of HF signals relative to the position of wheel sensor module 26, and the variable shadowing by other vehicle components due to wheel sensor module 26 rotating together with its corresponding wheel as described above.

Controller selects one of the wheels in order to determine which wheel sensor module 26 is associated with the selected wheel. The selected wheel has a wheel position which is known to controller 14. Controller 14 receives the rotational speed signals of the wheels from wheel speed sensors 24. Controller 14 evaluates the rotational speed signal of the selected wheel to determine each revolution of the selected wheel. Controller 14 modulates the constant strength HF signal transmitted from controller 14 to wheel sensor modules 26 as a function of the rotational speed signal of the selected wheel. More particularly, controller 14 interrupts the transmission of the otherwise constant HF signal for a period of time after each full revolution of the selected wheel. The interruption period is a brief period of time as compared to the time for the wheel to make one full revolution.

FIG. 3B illustrates the trace of the HF signal as received by the wheel sensor module 26 corresponding to the selected wheel. FIG. 3C illustrates the trace of the HF signal as received by each of the other wheel sensor modules 26 which do not correspond to the selected wheel. The signal interruptions of the HF signal result in characteristic rectangular drops in the trace of the field strength of the HF signal as received by each wheel sensor module 26. Micro-controller 30 of each wheel sensor module 26 evaluates the time interval between these drops in the receiving field strength at other characteristic locations of the field strength trace such as at extreme locations of the field strength trace.

If the time interval between the minimum value of the field strength trace and the field strength interruption remains constant over multiple wheel revolutions (as shown in the trace of FIG. 3B) the wheel speed pulses modulated by controller 14 are included in wheel sensor module 26 which is evaluating the HF signal trace. As a result, this wheel sensor module 26 corresponds to the selected wheel. This wheel sensor module 26 transmits a confirmation of same to controller 14. Accordingly, controller 14 determines this wheel sensor module 26 to be associated with the selected wheel and corresponds this wheel sensor module 26 with the wheel position of the selected wheel.

In contrast, at the other wheel sensor modules 26 (as shown in the trace of FIG. 3C) the time interval between the prominent locations in the trace of the receiving field strength changes as the number of wheel revolutions increases. As a result, these wheel sensor modules 26 do not correspond to the selected wheel and are located at the other wheel positions. These wheel sensor modules 26 may transmit a confirmation of same to controller 14.

The above process described with respect to FIG. 3 is repeated one at a time for each of the remaining wheel positions in order to determine which of the remaining wheel sensor modules 26 correspond to the remaining wheel positions.

Figure 4:
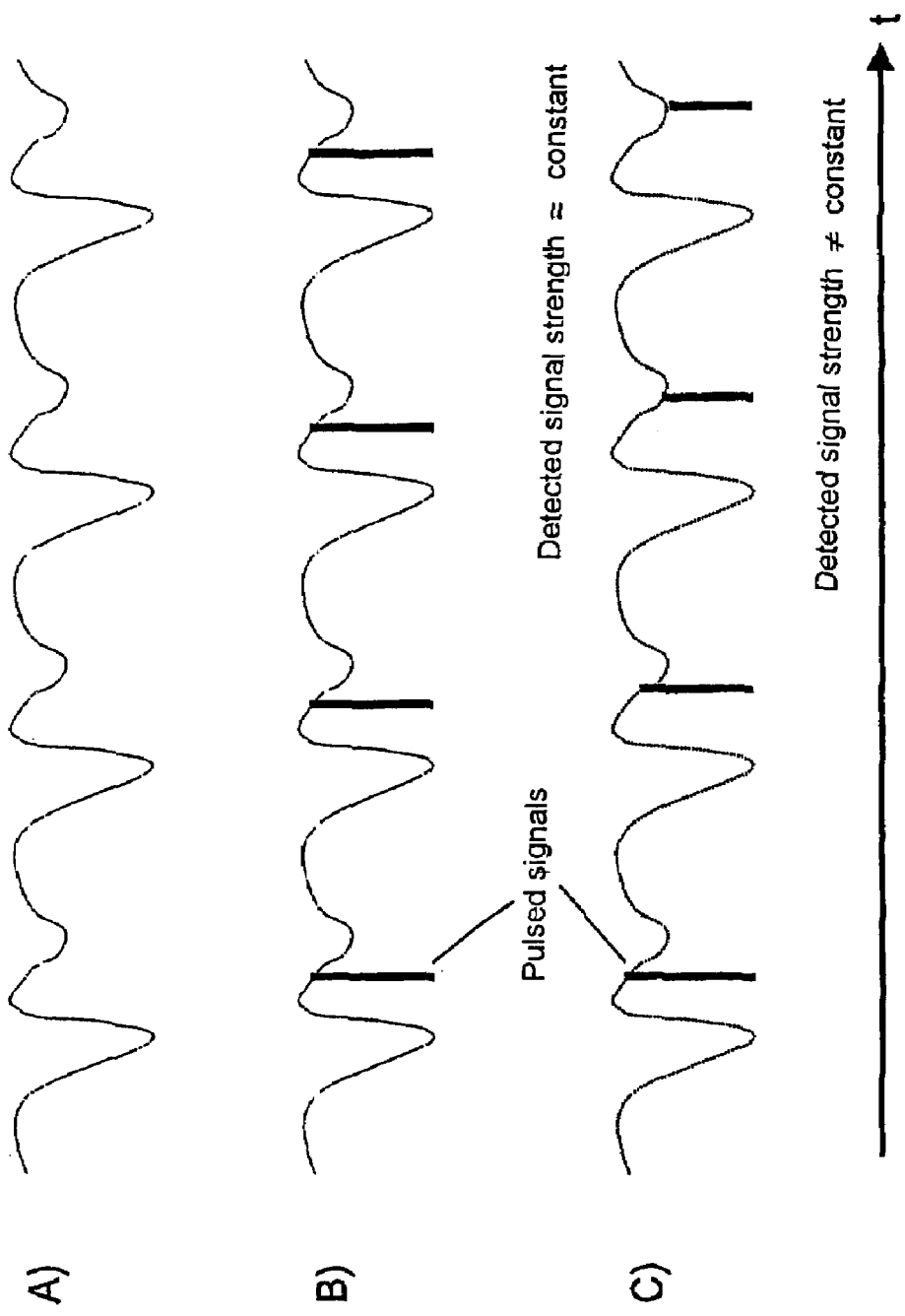
FIG. 4A illustrates a trace of a constant strength high-frequency signal as received from the controller by a wheel sensor module in accordance with another embodiment of the present invention.
FIG. 4B illustrates a trace of a high-frequency signal, modulated as a function of the rotation of the wheel at a selected wheel position, as received from the controller by the wheel sensor module corresponding to the selected wheel position in accordance with an embodiment of the present invention.
FIG. 4C illustrates a trace of the modulated high-frequency signal as received from the controller by the other wheel sensor modules which do not correspond to the selected wheel position in accordance with an embodiment of the present invention.

Referring now to FIG. 4, field strength traces of HF signals as received by wheel sensor modules 26 in accordance with another embodiment of the present invention are shown. FIG. 4 is illustrative of a different evaluation method than the evaluation method described with respect to FIG. 3 for determining which wheel sensor modules 26 correspond to which wheel positions. Like FIG. 3A, FIG. 4A illustrates the trace which would be recorded by a wheel sensor module 26 for a constant HF signal transmitted from controller 14. FIG. 4B illustrates the trace of an HF signal, modulated as a function of the rotation of the wheel at a selected wheel position, as received by the wheel sensor module 26 corresponding to the selected wheel position from controller 14. FIG. 4C illustrates the trace of the modulated HF signal as received by the other wheel sensor modules 26 which do not correspond to the selected wheel position from controller 14.

As described above, controller 14 does not transmit an HF signal which has a constant amplitude over time. Rather, controller 14 transmits an HF signal which is briefly interrupted after each revolution of a wheel selected by controller 14.

Each wheel sensor module 26 then records a pulsed signal whose receiving field strength depends on the particular instantaneous wheel position at the time of reception. For the wheel associated with the wheel speed signal of the selected wheel, the rotation-related variation in the field strength is synchronous with the wheel speed signal such that the incoming pulses after each wheel revolution meet the same phase of the field strength trace and consequently deliver a constant field strength signal.

Thus, if a wheel sensor module 26 determines that successive field strength signals have the same signal value (trace B in FIG. 4), then this wheel sensor module 26 reports to controller 14 that it is located at the position of the wheel whose wheel rotation signals are being transmitted (i.e., that it is located at the wheel position of the selected wheel). At the remaining wheel sensor modules 26 the value of the field strength signal varies with the wheel revolutions (trace C in FIG. 4). This process described with respect to FIG. 4 is repeated one at a time for each of the remaining wheel positions in order to determine which of the remaining wheel sensor modules 26 correspond to the remaining wheel positions.

In a further alternative evaluation method, when a pulsed signal is received from controller 14 all wheel sensor modules 26 report the value of the received signal field strength to controller 14. After multiple emitted pulses controller 14 determines the particular wheel sensor module 26 at which the receiving field strength remains constant over several wheel revolutions, and in this manner determines this wheel sensor module 26 as being associated with the wheel position of the selected wheel.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the presesnt invention.

What is claimed is:

1. A tire pressure control system for a vehicle having wheels with each wheel having a tire thereon, the system comprising:
 a controller having a transceiver, the controller being operable for receiving information indicative of the rotational speed of each wheel; and
 a plurality of tire pressure sensors each having a transceiver, the sensors respectively within the tires such that the sensors are respectively associated with the wheels, each sensor transmitting tire pressure information indicative of the pressure of the tire in which the sensor is within to the controller for the controller to determine the tire pressure of the tires;
 wherein the controller transmits to the sensors a signal modulated with signal markings based on the rotational speed of a selected wheel;
 wherein the signal as received by each sensor includes variations resulting from the rotation of the wheel associated with the sensor, wherein the variations of the signal as received by the sensor corresponding to the selected wheel remain constant over time with respect to the signal markings and the variations of the signal as received by each of the remaining sensors varies over time with respect to the signal markings;
 wherein each sensor correlates the variations of the signal as received by the sensor with the signal markings, wherein the sensor in which the variations of the signal as received by the sensor remain constant over time with respect to the signal markings transmits confirmation to the controller, wherein the controller determines this sensor as corresponding to the selected wheel based on the confirmation.

2. The system of claim 1 wherein:
 the controller modulates the signal with signal markings based on the rotational speed of the selected wheel by interrupting the signal during transmission from the controller.

3. The system of claim 2 wherein:
 the controller interrupts the signal during transmission from the controller each time the selected wheel completes a revolution.

4. The system of claim 1 wherein:
 the controller transmits to the sensors a second signal modulated with second signal markings based on the rotational speed of a second selected wheel;
 wherein the second signal as received by each sensor includes variations resulting from the rotation of the wheel associated with the sensor, wherein the variations of the second signal as received by the sensor corresponding to the second selected wheel remain constant over time with respect to the second signal markings and the variations of the second signal as received by each of the remaining sensors varies over time with respect to the second signal markings;
 wherein each sensor correlates the variations of the second signal as received by the sensor with the second signal markings, wherein the sensor in which the variations of the second signal as received by the sensor remain constant over time with respect to the second signal markings transmits confirmation to the controller, wherein the controller determines this sensor as corresponding to the second selected wheel based on the confirmation.

5. The system of claim 4 wherein the vehicle includes at least three wheels with each wheel having a tire thereon, wherein:
the controller transmits to the sensors a third signal modulated with third signal markings based on the rotational speed of a third selected wheel;
wherein the third signal as received by each sensor includes variations resulting from the rotation of the wheel associated with the sensor, wherein the variations of the third signal as received by the sensor corresponding to the third selected wheel remain constant over time with respect to the third signal markings and the variations of the third signal as received by each of the remaining sensors varies over time with respect to the third signal markings;
wherein each sensor correlates the variations of the third signal as received by the sensor with the third signal markings, wherein the sensor in which the variations of the third signal as received by the sensor remain constant over time with respect to the third signal markings transmits confirmation to the controller, wherein the controller determines this sensor as corresponding to the third selected wheel based on the confirmation.

6. The system of claim 1 wherein:
the signal transmitted by the controller to the sensors has a constant amplitude which is interrupted after each revolution of the selected wheel;
wherein each sensor monitors for time constancy the time interval of the interruptions of the signal as received by the sensor with respect to a characteristic value of the signal as received by the sensor to determine whether the variations of the signal as received by the sensor remain constant or vary over time with respect to the signal markings.

7. The system of claim 6 wherein:
the characteristic value is an extreme amplitude value of the signal as received by the sensor.

8. The system of claim 1 wherein:
the signal transmitted by the controller to the sensors has a constant amplitude which is interrupted after each revolution of the selected wheel;
wherein each sensor monitors for amplitude constancy of the interruptions of the signal as received by the sensor to determine whether the variations of the signal as received by the sensor remain constant or vary over time with respect to the signal markings.

9. The system of claim 1 wherein:
at each revolution of the selected wheel, the controller performs a keying of the frequency or the phase of the signal transmitted to the sensors, and in each case upon receipt of the signal the sensors determine the value of the frequency or the phase of the signal, and each sensor for time constancy the time interval of the blanking intervals thus produced in the signal with respect to a characteristic value of the signal.

10. A tire pressure control system for a vehicle having wheels with each wheel having a tire thereon, the system comprising:
a controller having a transceiver, the controller being operable for receiving information indicative of the rotational speed of each wheel; and
a plurality of tire pressure sensors each having a transceiver, the sensors respectively within the tires such that the sensors are respectively associated with the wheels, each sensor transmitting tire pressure information indicative of the pressure of the tire in which the sensor is within to the controller;
wherein the controller transmits to the sensors a signal periodically marked with a signal marking upon each revolution of a selected wheel;
wherein the signal as received by each sensor includes variations resulting from the rotation of the wheel associated with the sensor, wherein the variations of the signal as received by the sensor corresponding to the selected wheel agree over time with the signal markings and the variations of the signal as received by each of the remaining sensors vary over time with the signal markings;
wherein each sensor correlates the variations of the signal as received by the sensor with the signal markings, wherein the sensor in which the variations of the signal as received by the sensor agree over time with the signal markings transmits confirmation to the controller, wherein the controller determines this sensor as corresponding to the selected wheel based on the confirmation.

11. The system of claim 10 wherein:
the controller periodically marks the signal with signal markings based upon each revolution of the selected wheel by interrupting the signal during transmission from the controller upon each revolution of the selected wheel.

12. The system of claim 10 wherein:
the controller periodically marks the signal with signal markings upon each revolution of the selected wheel by interrupting the signal during transmission from the controller.

13. The system of claim 10 wherein:
the controller transmits to the sensors a second signal periodically marked with a second signal marking upon each revolution of a second selected wheel;
wherein the second signal as received by each sensor includes variations resulting from the rotation of the wheel associated with the sensor, wherein the variations of the second signal as received by the sensor corresponding to the second selected wheel agree over time with the second signal markings and the variations of the second signal as received by each of the remaining sensors vary over time with the second signal markings;
wherein each sensor correlates the variations of the second signal as received by the sensor with the second signal markings, wherein the sensor in which the variations of the second signal as received by the sensor agree over time with the second signal markings transmits confirmation to the controller, wherein the controller determines this sensor as corresponding to the second selected wheel based on the confirmation.

14. The system of claim 13 wherein the vehicle includes at least three wheels with each wheel having a tire thereon, wherein:
the controller transmits to the sensors a third signal periodically marked with a third signal marking upon each revolution of a third selected wheel;
wherein the third signal as received by each sensor includes variations resulting from the rotation of the wheel associated with the sensor, wherein the variations of the third signal as received by the sensor corresponding to the third selected wheel agree over time with the third signal markings and the variations of the third signal as received by each of the remaining sensors vary over time with the third signal markings;

wherein each sensor correlates the variations of the third signal as received by the sensor with the third signal markings, wherein the sensor in which the variations of the third signal as received by the sensor agree over time with the third signal markings transmits confirmation to the controller, wherein the controller determines this sensor as corresponding to the third selected wheel based on the confirmation.

15. The system of claim 10 wherein:

the signal transmitted by the controller to the sensors has a constant amplitude which is interrupted after each revolution of the selected wheel;

wherein each sensor monitors for time constancy the time interval of the interruptions of the signal as received by the sensor with respect to a characteristic value of the signal as received by the sensor to determine whether the variations of the signal as received by the sensor remain agree or disagree over time with the signal markings.

16. The system of claim 10 wherein:

the signal transmitted by the controller to the sensors has a constant amplitude which is interrupted after each revolution of the selected wheel;

wherein each sensor monitors for amplitude constancy of the interruptions of the signal as received by the sensor to determine whether the variations of the signal as received by the sensor agree or disagree over time with the signal markings.

17. A tire pressure control system for a vehicle having wheels with each wheel having a tire thereon, the system comprising:

a controller having a transceiver, the controller being operable for receiving information indicative of rotation of each wheel; and a plurality of tire pressure sensors each having a transceiver, the sensors being respectively within the tires such that the sensors are respectively associated with the wheels, each sensor transmitting tire pressure information indicative of the pressure of the tire in which the sensor is within to the controller;

wherein the controller transmits to the sensors a signal having markings containing periodicity corresponding to the time for a selected wheel to make a revolution;

wherein the signal as received by each sensor includes a periodic portion resulting from rotation of the wheel associated with the sensor relative to the controller, wherein the periodic portion of the signal as received by the sensor corresponding to the selected wheel agrees with the markings and the periodic portion of the signal as received by each of the remaining sensors varies relative to the markings;

wherein each sensor correlates the periodic portion of the signal as received by the sensor with the markings, wherein the sensor in which the periodic portion of the signal as received by the sensor agrees with the markings transmits confirmation to the controller, wherein the controller determines this sensor as corresponding to the selected wheel based on the confirmation.

18. The system of claim 17 wherein:

the controller transmits to the sensors the signal having the markings by interrupting the signal during transmission from the controller each time the selected wheel makes a revolution.

19. The system of claim 17 wherein:

the controller transmits to the sensors a second signal having second markings containing periodicity corresponding to the time for a second selected wheel to make a revolution;

wherein the second signal as received by each sensor includes a periodic portion resulting from rotation of the wheel associated with the sensor relative to the controller, wherein the periodic portion of the second signal as received by the sensor corresponding to the selected wheel agrees with the second markings and the periodic portion of the second signal as received by each of the remaining sensors varies relative to the second markings;

wherein each sensor correlates the periodic portion of the second signal as received by the sensor with the second markings, wherein the sensor in which the periodic portion of the second signal as received by the sensor agrees with the second markings transmits confirmation to the controller, wherein the controller determines this sensor as corresponding to the second selected wheel based on the confirmation.

20. The system of claim 19 wherein the vehicle includes at least three wheels with each wheel having a tire thereon, wherein:

the controller transmits to the sensors a third signal having third markings containing periodicity corresponding to the time for a third selected wheel to make a revolution;

wherein the third signal as received by each sensor includes a periodic portion resulting from rotation of the wheel associated with the sensor relative to the controller, wherein the periodic portion of the third signal as received by the sensor corresponding to the selected wheel agrees with the third markings and the periodic portion of the third signal as received by each of the remaining sensors varies relative to the third markings;

wherein each sensor correlates the periodic portion of the third signal as received by the sensor with the third markings, wherein the sensor in which the periodic portion of the third signal as received by the sensor agrees with the third markings transmits confirmation to the controller, wherein the controller determines this sensor as corresponding to the second selected wheel based on the confirmation.

\* \* \* \* \*